United States Patent
Ando et al.

(10) Patent No.: US 9,528,452 B2
(45) Date of Patent: Dec. 27, 2016

(54) CONTROL DEVICE FOR INTERNAL COMBUSTION ENGINE

(75) Inventors: Ikuo Ando, Toyota (JP); Takeshi Genko, Nisshin (JP); Yosuke Matsumoto, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 222 days.

(21) Appl. No.: 13/881,069

(22) PCT Filed: Oct. 26, 2010

(86) PCT No.: PCT/JP2010/068924
§ 371 (c)(1),
(2), (4) Date: Apr. 23, 2013

(87) PCT Pub. No.: WO2012/056515
PCT Pub. Date: May 3, 2012

(65) Prior Publication Data
US 2013/0206119 A1     Aug. 15, 2013

(51) Int. Cl.
*F02D 41/00*     (2006.01)
*F02D 21/08*     (2006.01)
*F02D 41/14*     (2006.01)

(52) U.S. Cl.
CPC .............. *F02D 41/00* (2013.01); *F02D 21/08* (2013.01); *F02D 41/0047* (2013.01); *F02D 41/1475* (2013.01); *F02D 41/1454* (2013.01); *Y02T 10/47* (2013.01)

(58) Field of Classification Search
CPC .. F02D 41/00; F02D 41/0052; F02D 41/0072; F02D 2041/0017; F02D 21/04; F02D 21/08
See application file for complete search history.

(56) References Cited

U.S. PATENT DOCUMENTS

| | | | |
|---|---|---|---|
| 4,739,740 A | * | 4/1988 | Ohkawara ........... F02D 41/1477 123/684 |
| 5,201,173 A | * | 4/1993 | Fujimoto ............ F02D 41/0047 60/277 |
| 5,775,099 A | * | 7/1998 | Ito ......................... F01N 3/0842 123/430 |

(Continued)

FOREIGN PATENT DOCUMENTS

| | | |
|---|---|---|
| EP | 0897741 A2 | 2/1999 |
| JP | 05-302543 A | 11/1993 |

(Continued)

*Primary Examiner* — Stephen K Cronin
*Assistant Examiner* — Kevin R Steckbauer
(74) *Attorney, Agent, or Firm* — Andrews Kurth Kenyon LLP

(57) ABSTRACT

An internal combustion engine executes EGR and controls the air-fuel ratio based on a detected oxygen concentration in the exhaust. An electronic control unit controls the engine such that the detected value for the air-fuel ratio upstream from a front catalyst provided in an exhaust pipe reaches a value indicating a leaner air-fuel ratio when EGR is being executed than when not executed. Therefore, the controlled air-fuel ratio follows shifting of a window to the leaner side in response to execution of EGR, so that the air-fuel ratio is controlled more precisely in response to the execution of EGR.

6 Claims, 4 Drawing Sheets

(56) References Cited

U.S. PATENT DOCUMENTS

| | | | | |
|---|---|---|---|---|
| 5,979,398 A | * | 11/1999 | Yanagihara | F02B 3/06 123/299 |
| 6,173,704 B1 | | 1/2001 | Komoriya et al. | |
| 6,434,929 B1 | * | 8/2002 | Nishimura | F02D 21/08 60/278 |
| 6,634,345 B2 | * | 10/2003 | Yoshizaki | F02D 41/0057 123/568.12 |
| 6,941,747 B1 | * | 9/2005 | Houston | F01N 3/0842 60/274 |
| 6,971,343 B2 | * | 12/2005 | Hitomi | F01L 1/267 123/27 R |
| 7,159,388 B2 | * | 1/2007 | Nakagawa | F01N 3/101 60/277 |
| 9,243,579 B2 | * | 1/2016 | Pruemm | F02D 41/3011 |
| 9,255,532 B2 | * | 2/2016 | Genko | F02D 41/1441 |
| 2002/0020373 A1 | * | 2/2002 | Nishimura | F02D 21/08 123/90.13 |
| 2005/0022510 A1 | * | 2/2005 | Nakagawa | F01N 3/101 60/285 |
| 2012/0004828 A1 | * | 1/2012 | Okazaki | F02D 13/0226 701/103 |
| 2013/0133635 A1 | * | 5/2013 | Genko | F02D 41/1441 123/674 |
| 2013/0160429 A1 | * | 6/2013 | Cattani | F01N 3/10 60/274 |
| 2013/0213363 A1 | * | 8/2013 | Pruemm | F02D 41/3011 123/491 |
| 2015/0218994 A1 | * | 8/2015 | Nogawa | F02D 41/0275 60/285 |
| 2016/0222896 A1 | * | 8/2016 | Hotta | F02D 41/0052 60/278 |

FOREIGN PATENT DOCUMENTS

| | | | | |
|---|---|---|---|---|
| JP | 05-302548 A | | 11/1993 | |
| JP | 08-210164 A | | 8/1996 | |
| JP | H08210164 A | * | 8/1996 | F02D 21/08 |
| JP | 2005-048711 A | | 2/2005 | |
| JP | 2008-133744 A | | 6/2008 | |
| JP | 2008133744 A | * | 6/2008 | |

* cited by examiner

CONTROL DEVICE FOR INTERNAL COMBUSTION ENGINE

This is a 371 national phase application of PCT/JP2010/068924 filed 26 Oct. 2010, the contents of which are incorporated herein by reference.

FIELD OF THE INVENTION

The present invention relates to a control device for an internal combustion engine that executes air-fuel ratio control in accordance with a detection result of oxygen concentration in exhaust gas, as well as exhaust gas recirculation.

BACKGROUND OF THE INVENTION

As known in the art, control procedures applied to an internal combustion engine mounted, for example, in a vehicle, include air-fuel ratio control for controlling the air-fuel ratio of air-fuel mixture to be combusted in a cylinder. In the air-fuel ratio control, the air-fuel ratio of combusted air-fuel mixture is obtained from a detection result of the oxygen concentration in the exhaust gas, and a fuel injection amount is feedback-controlled such that the obtained air-fuel ratio becomes a target value.

Patent Document 1: Japanese Laid-Open Patent Publication No. 2005-048711. Conventionally, Patent Document 1 has disclosed one example of a control device for an internal combustion engine that executes air-fuel ratio control. The device disclosed in the document has a main air-fuel ratio sensor located upstream of a catalyst in the exhaust pipe and a sub-oxygen sensor located downstream of the catalyst. Main feedback control is executed in which output of the main air-fuel ratio sensor is fed back to the fuel injection amount such that the air-fuel ratio at a section upstream of the catalyst becomes equal to a target air-fuel ratio. Concurrently, sub-feedback control is executed in which output of the sub-oxygen sensor is fed back to the fuel injection amount such that the air-fuel ratio of the exhaust gas flowing out of the catalyst becomes equal to the stoichiometric air-fuel ratio.

As described in the publication, the range of air-fuel ratio that allows a catalyst to properly purify exhaust gas, which is referred to as a window, changes in accordance with changes in the operating state of an internal combustion engine. For example, it is known that during a high load operation of an internal combustion engine, an air-fuel ratio optimal for exhaust purification becomes richer. The reason for this is as follows. That is, during a high load operation, the amount of oxygen entering a catalyst per unit time increases. Storing of oxygen by a catalyst is a physical phenomenon and therefore occurs very rapidly. In contrast, release of oxygen from the catalyst is a chemical reaction and therefore occurs relatively slowly. Thus, when a large amount of oxygen flows into the catalyst, the oxygen concentration is increased in the catalyst. This shifts the window to the richer side.

PRIOR ART DOCUMENT

Patent Document

Patent Document 1: Japanese Laid-Open Patent Publication No. 2005-048711

SUMMARY OF THE INVENTION

Problems that the Invention is to Solve

Some vehicle engines are equipped with exhaust gas recirculation (EGR) feature for recirculating some of exhaust gas to intake air. Depending on the type of EGR, only inert exhaust gas is added to the intake air. Therefore, with the same load, the amount of oxygen entering a catalyst per unit time is constant regardless whether EGR is being executed or not. Thus, at the same engine load, the window ought to remain unchanged regardless whether EGR is being executed or not. However, contrary to such conventional knowledge, the present inventors found out, through experimentation they performed, that the window is changed by execution or non-execution of EGR.

FIG. 5 shows the relationship between engine speeds and values of a parameter EKAFCAT in two cases: a case in which EGR is being executed and a case in which EGR is not being executed. The parameter EKAFCAT indicates a saturation value of a feedback integral term in the air-fuel ratio control when the engine is in steady operation with the engine speed and the load maintained at constant values. The value of the parameter EKAFCAT is increased as the widow is shifted to the richer side. For example, the relationship between the stoichiometric air-fuel ratio and the controlled air-fuel ratio optimal for exhaust purification is represented by the following expression (1) using the parameter EKAFCAT.

$$\text{Stoichiometric Air-Fuel Ratio} \times 1/(1+EKAFCAT) = \text{Controlled Air-Fuel Ratio} \quad (1)$$

As shown in the drawing, the value of the parameter EKAFCAT, or the window of the air-fuel ratio that allows proper execution of exhaust purification, is significantly changed based on whether EGR is being executed or not. This tendency has been observed in various types of internal combustion engines having different configurations. As shown in FIG. 6, it has been discovered that the larger the amount of EGR, the smaller the value of the parameter EKAFCAT becomes, and that the window is shifted to the leaner side, accordingly. As described above, the execution of EGR theoretically ought to have no influence on the window, and the mechanism behind the experimentation results is still unknown.

Accordingly, it is an objective of the present invention to provide a control device for an internal combustion engine that is capable of properly executing air-fuel ratio control in accordance with the execution state of EGR.

Means for Solving the Problems

To achieve the foregoing objective and in accordance with one aspect of the present invention, a control device for an internal combustion engine is provided. The engine executes exhaust gas recirculation and air-fuel ratio control based on a detection result of an oxygen concentration of exhaust gas. The control device executes engine control such that, when the amount of exhaust gas recirculation is large, a detection value of air-fuel ratio at a section upstream of a catalyst located in an exhaust pipe has a value indicating a leaner air-fuel ratio compared to a case in which the exhaust gas recirculation amount is small.

As described above, the window, or the range of air-fuel ratio allowing proper exhaust purification, was observed to be shifted to the leaner side as the EGR amount was increased. In this respect, the control device for an internal combustion engine according to the above invention executes the engine control such that, when the EGR amount is large, the detection value of air-fuel ratio at the section upstream of the catalyst provided in the exhaust pipe becomes a value that indicates a leaner air-fuel ratio than that in a case in which the EGR amount is small. Therefore, the controlled air-fuel ratio is followed by shifting of the window in response to execution of EGR. Accordingly, the control device for an internal combustion engine according to the above invention is capable of executing air-fuel ratio control in accordance with the execution state of EGR.

The above described engine control can be executed by adjusting the target air-fuel ratio in accordance with the execution state of EGR. More specifically, the above described engine control can be executed by shifting the target air-fuel ratio to the leaner side during execution of EGR compared to the target air-fuel ratio during non-execution of EGR or by setting the target air-fuel ratio such that the larger the amount of EGR, the leaner the value of the target air-fuel ratio becomes.

To achieve the foregoing objective and in accordance with another aspect of the present invention, a control device for an internal combustion engine is provided. The engine executes exhaust gas recirculation and air-fuel ratio control based on a detection result of an oxygen concentration of exhaust gas. The control device executes feedback control of a target air-fuel ratio in the air-fuel ratio control in accordance with an execution state of the exhaust gas recirculation.

Depending on the execution state of EGR, the window, or the range of the air-fuel ratio allowing proper exhaust purification, changes. Therefore, if the target air-fuel ratio in the air-fuel ratio control is subjected to feedback control in accordance with the execution state of EGR, it is possible to allow the target air-fuel ratio to follow changes of the window due to the execution state of EGR. Accordingly, the control device for an internal combustion engine according to the above invention is capable of executing air-fuel ratio control in accordance with the execution state of EGR.

Feedback of the execution state of EGR to the target air-fuel ratio in the air-fuel ratio control can be performed by setting the target air-fuel ratio to be leaner during the execution of EGR than during non-execution of EGR. Such feedback can also be performed by setting the target air-fuel ratio such that the larger the EGR amount, the leaner the value of the target air-fuel ratio is changed.

DETAILED DESCRIPTION

First Embodiment

Figure 1:
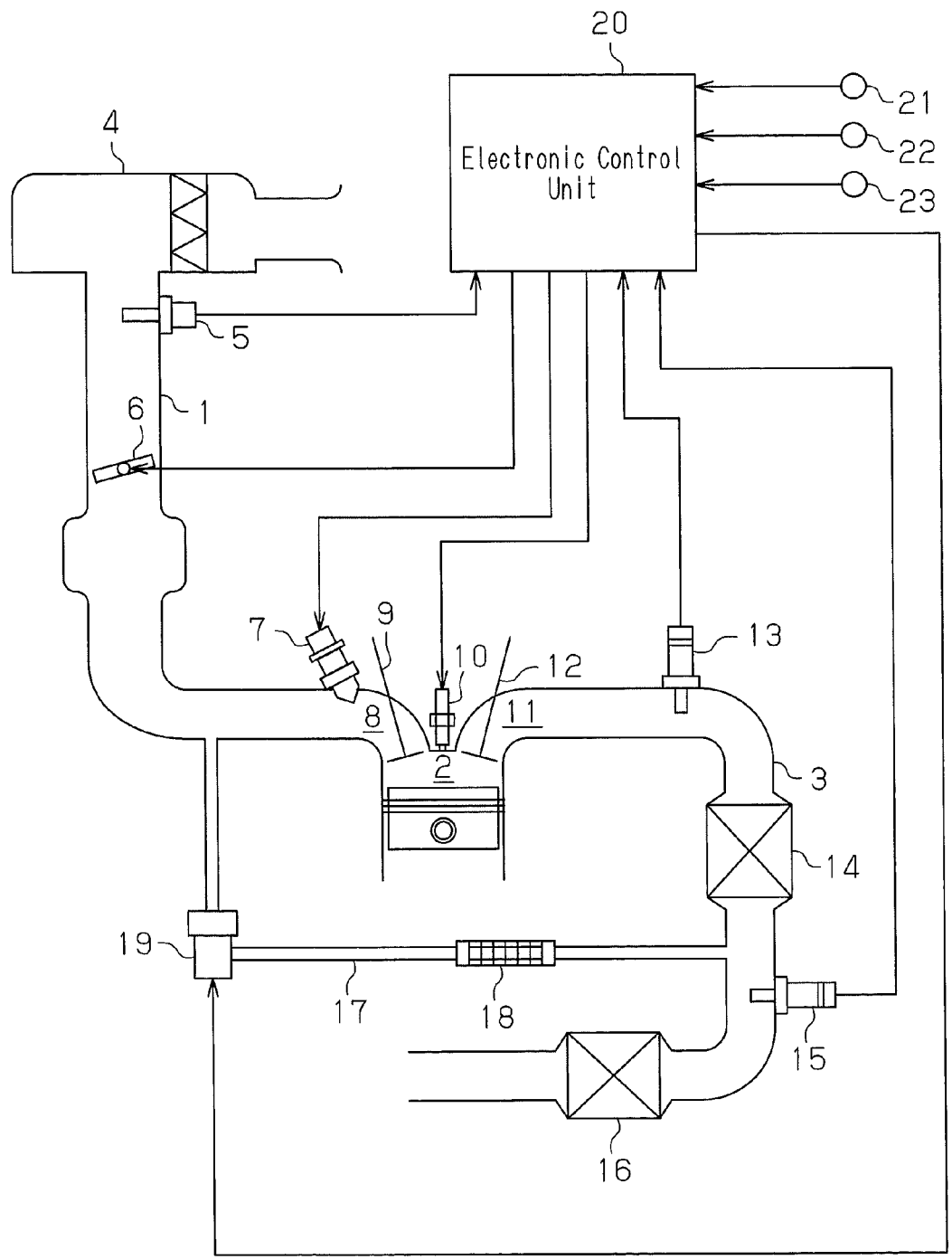
FIG. 1 is a schematic diagram showing the configuration of an internal combustion engine to which a control device according to a first embodiment of the present invention is applied.
Figure 2:
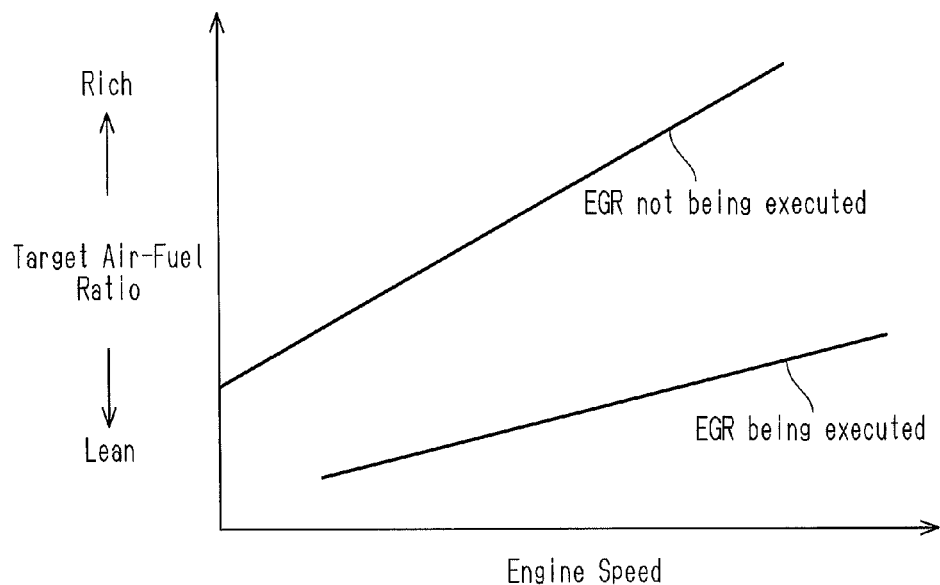
FIG. 2 is a graph showing the relationship between a target air-fuel ratio and an engine speed during execution of EGR and during non-execution of EGR when a certain load is applied to the engine.
Figure 3:
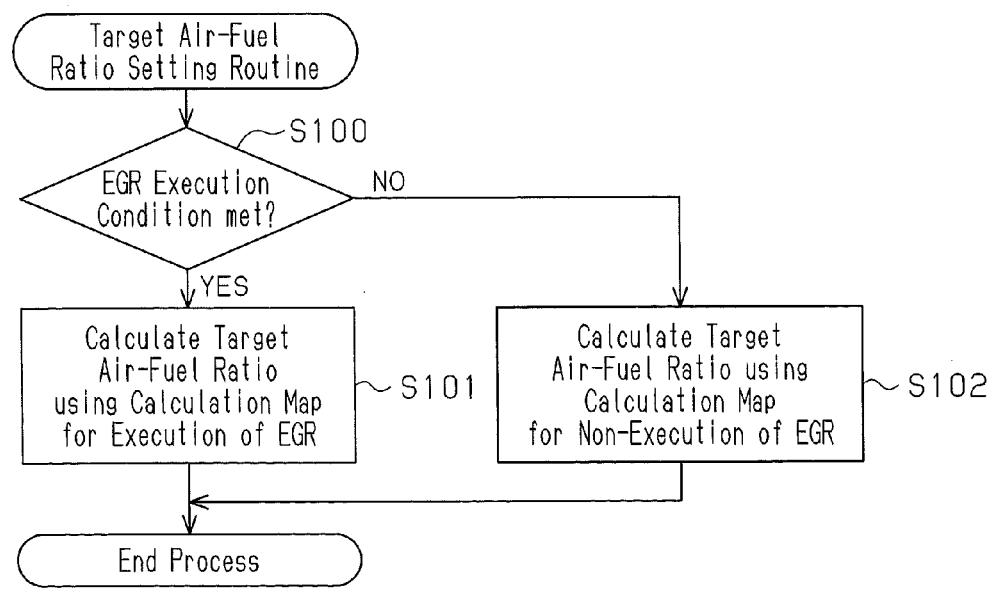
FIG. 3 is a flowchart showing a target air-fuel ratio setting routine employed in the control device according to the first embodiment.

With reference to FIGS. 1 to 3, a control device for an internal combustion engine according to a first embodiment of the present invention will be described. The control device of the present embodiment is applied to a vehicle-mounted internal combustion engine.

As shown in FIG. 1, an internal combustion engine to which the control device of the present is applied includes an intake pipe 1, through which intake air flows, a combustion chamber 2, in which air-fuel mixture of fuel and air supplied through the intake pipe 1 is combusted, and an exhaust pipe 3, through which exhaust gas generated by combustion is passed.

The internal combustion engine has in the intake pipe 1: an air cleaner 4 for purifying intake air, an air flowmeter 5 for detecting the amount of intake air, a throttle valve 6 for regulating the flow rate of intake air, and an injector 7 for injecting fuel into the intake air. The components are arranged in that order from the upstream end. The intake pipe 1 is connected to the combustion chamber 2 via an intake port 8. The intake port 8 and the combustion chamber 2 are connected with and disconnected from each other in accordance with opening and closing of an intake valve 9.

The internal combustion engine further has an ignition plug 10 arranged in the combustion chamber 2. The ignition plug 10 ignites air-fuel mixture introduced to the combustion chamber 2. The combustion chamber 2 is connected to an exhaust pipe 3 via an exhaust port 11. The combustion chamber 2 and the exhaust port 11 are connected with and disconnected from each other in accordance with opening and closing of an exhaust valve 12.

Further, the internal combustion engine has in the exhaust pipe 3: an air-fuel ratio sensor 13, a front catalyst 14, an oxygen sensor 15, and a rear catalyst 16, which are arranged in that order from the upstream end. The air-fuel ratio sensor 13 detects the air-fuel ratio of air-fuel mixture that has been combusted based on the oxygen concentration in exhaust gas. The front catalyst 14 purifies exhaust gas. The oxygen sensor 15 detects, based on the oxygen concentration of exhaust gas, whether the air-fuel ratio of combusted air-fuel mixture is richer than or leaner than the stoichiometric air-fuel ratio. The rear catalyst 16 purifies exhaust gas.

The internal combustion engine also has an exhaust gas recirculation (EGR) passage 17 for recirculating some of exhaust gas to intake air. The EGR passage 17 is connected to a section of the exhaust pipe 3 between the front catalyst 14 and the rear catalyst 16, and the end of the EGR passage 17 is connected to a section of the intake pipe 1 that is downstream of the throttle valve 6. An EGR cooler 18 for cooling recirculated exhaust gas and an EGR valve 19 for adjusting the EGR amount are provided in the EGR passage 17.

The internal combustion engine configured as described above is controlled by an electronic control unit 20. The electronic control unit 20 has a central processing unit (CPU), which executes various types of computation processes related to engine control and a read-only memory (ROM), which stores programs and data for executing control procedures. The electronic control unit 20 further includes a random access memory (RAM) for temporarily storing computation results of the CPU and detection results of sensors and input-output port (I/O) serving as an interface for sending out signals and receiving signals from the outside.

The input port of the electronic control unit 20 is connected to the air flowmeter 5, the air-fuel ratio sensor 13, and the oxygen sensor 15. The input port is also connected to an NE sensor 21 for detecting the engine speed, an accelerator pedal sensor 22 for detecting an accelerator manipulation amount, and a throttle sensor 23 for detecting the opening degree of the throttle valve 6. The output port of the electronic control unit 20 is connected to the drive circuits of engine controlling actuators such as the throttle valve 6, the injector 7, the ignition plug 10, and the EGR valve 19.

In the internal combustion engine configured as described above, the electronic control unit 20 executes air-fuel ratio control based on outputs of the air-fuel ratio sensor 13 and the oxygen sensor 15. The air-fuel ratio control is executed through two feedbacks: a main feedback based on the output of the air-fuel ratio sensor 13 and a sub-feedback based on the output of the oxygen sensor 15. Specifically, in the main feedback, the output of the air-fuel ratio sensor 13 is fed back to the fuel injection amount such that the controlled air-fuel ratio at a section upstream of the front catalyst 14 becomes equal to a target air-fuel ratio. The sub-feedback is executed concurrently in which the output of the oxygen sensor 15 is fed back to the fuel injection amount such that the air-fuel ratio of the exhaust gas flowing out of the front catalyst 14 becomes equal to the stoichiometric air-fuel ratio.

As described above, it has been discovered that the window, or the range of air-fuel ratio allowing proper exhaust purification, changes according to the execution state of EGR. Accordingly, in the present embodiment, the engine control is executed such that, when EGR is being executed, the detection value of the air-fuel ratio in the section upstream of the front catalyst 14 provided in the exhaust pipe 3 becomes a value that indicates a leaner air-fuel ratio than that in a case in which EGR is not being executed. Specifically, such engine control is executed in the present embodiment by setting the target air-fuel ratio of the main feedback to be leaner when EGR is being executed than when EGR is not being executed.

FIG. 2 shows relationships between a target air-fuel ratio and an engine speed during execution of EGR and during non-execution of EGR when a certain load is applied to the engine. As shown in the drawing, if the engine load and the engine speed are constant, the target air-fuel ratio in execution of EGR is set to be leaner than that in a non-execution of EGR.

FIG. 3 shows a flowchart of a target air-fuel ratio setting routine used in the present embodiment. The process of the routine is repeatedly executed as an interrupt by the electronic control unit 20, for example, at predetermined time intervals during operation of the engine.

When the routine is started, the electronic control unit 20 determines whether an EGR execution condition is met at step S100. If the EGR execution condition is met (S100: YES), the electronic control unit 20 computes a target air-fuel ratio at step S101 using a calculation map for execution of EGR based on the engine load and the engine speed. If the EGR execution condition is not met, the electronic control unit 20 computes a target air-fuel ratio at step S102 using a calculation map for non-execution of EGR based on the engine load and the engine speed. As compared to the calculation map for non-execution of EGR, the calculation map for execution of EGR sets the target air-fuel ratio to be leaner for the same engine load and the same engine speed. Therefore, in the present embodiment, the target air-fuel ratio in execution of EGR is set to be leaner than that in non-execution of EGR.

The preferred embodiment as described above has the following advantages.

(1) The present embodiment is applied to an internal combustion engine that executes air-fuel ratio control based on a detection result of the oxygen concentration of exhaust gas. Specifically, during execution of EGR, the electronic control unit 20 executes engine control such that the detection value of the air-fuel ratio at the section upstream of the front catalyst 14 becomes a value that indicates a leaner air-fuel ratio compared to that in non-execution of EGR. As described above, the window, or the range of air-fuel ratio allowing proper exhaust purification, was observed to be shifted to the leaner side as the EGR amount was increased. In this respect, when the EGR amount is large in the present embodiment, the engine control is executed such that, compared to a case in which the EGR amount is small, the detection value of the air-fuel ratio at the section upstream of the front catalyst 14 provided in the exhaust pipe 3 becomes a value that indicates a leaner air fuel ratio. Therefore, in the present embodiment, the controlled air-fuel ratio follows shifting of the window in response to execution of EGR, so that the air-fuel ratio control is executed more adequately in accordance with the execution state of EGR.

(2) In the present embodiment, the target air-fuel ratio is adjusted in accordance with the execution state of EGR. More specifically, the target air-fuel ratio is set to a leaner value when EGR is being executed than when EGR is not being executed. This allows the controlled air-fuel ratio to accurately follow a change of the window in response to execution of EGR.

(3) The present embodiment is applied to an internal combustion engine that executes air-fuel ratio control based on a detection result of the oxygen concentration of exhaust gas. Specifically, the electronic control unit 20 executes feedback control of the target air-fuel ratio in the air-fuel ratio control in accordance with the execution state of EGR. More specifically, the feedback is executed by setting the target air-fuel ratio to a leaner value when EGR is being executed than when EGR is not being executed. Depending on the execution state of EGR, the window, or the range of the air-fuel ratio allowing proper exhaust purification, changes. Therefore, if the target air-fuel ratio in the air-fuel ratio control is subjected to feedback control in accordance with the execution state of EGR, it is possible to allow the target air-fuel ratio to follow changes of the window due to the execution state of EGR. Accordingly, the present embodiment allows the air-fuel ratio control to be properly executed in accordance with the execution state of EGR.

Second Embodiment

Next, with reference to FIG. 4, a control device for an internal combustion engine according to a second embodiment of the present invention will be described. The present embodiment has the same configuration as the first embodiment except for the contents of the target air-fuel ratio setting routine. Therefore, like or the same reference numerals are given to those components that are like or the same as the corresponding components of the first embodiment and detailed explanations are omitted.

Figure 6:
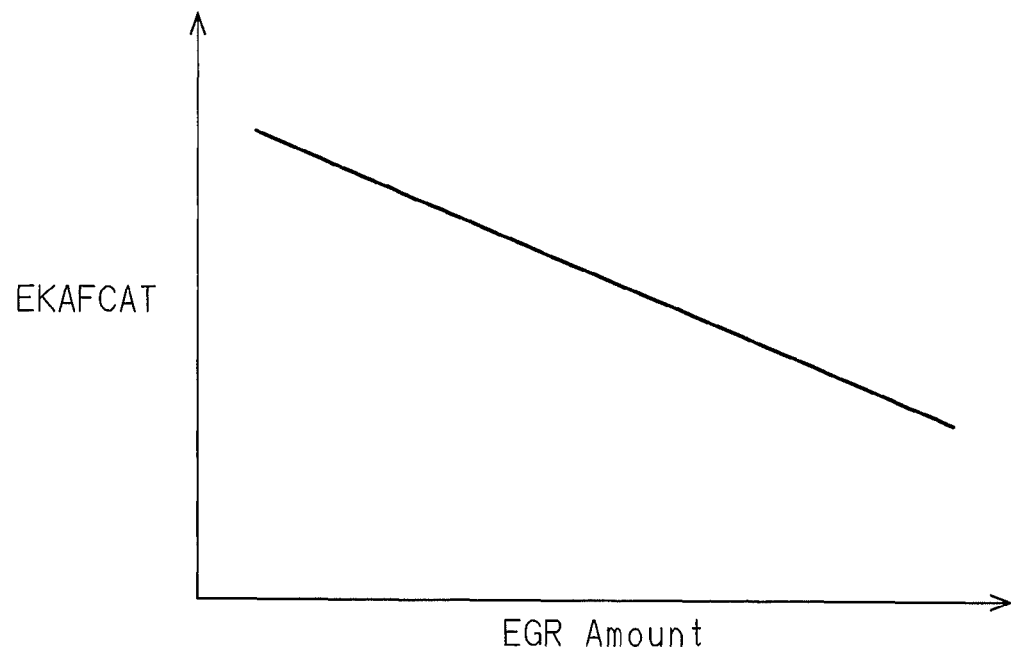
FIG. 6 is a graph showing the relationship between the EGR amount and the parameter EKAFCAT.

As shown in FIG. 6, the window, in which exhaust gas can be properly purified, is changed in accordance with the amount of EGR even during the execution of EGR. Specifically, the larger the amount of EGR, the leaner the window is shifted. In this regard, the target air-fuel ratio is changed to a leaner value in accordance with increase in the EGR amount in the present embodiment, so that the air-fuel ratio control is properly executed according to the execution state of EGR.

Figure 4:
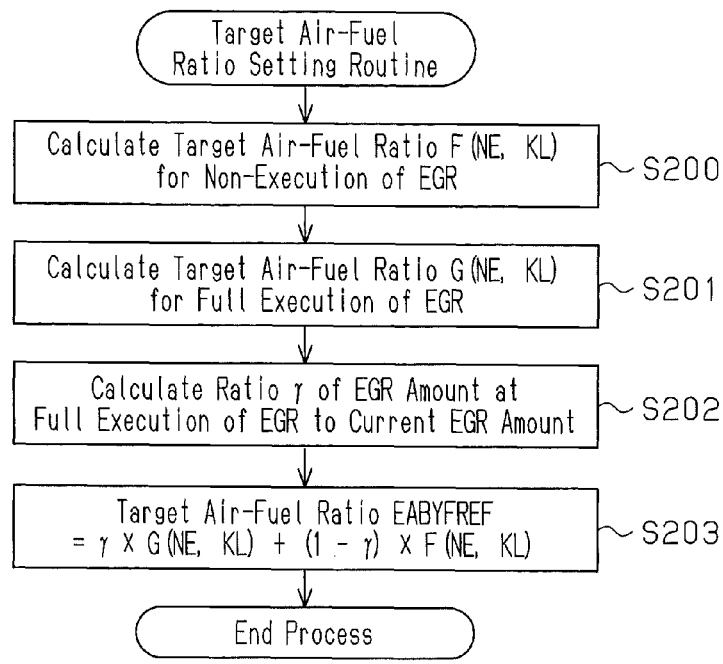
FIG. 4 is a flowchart showing a target air-fuel ratio setting routine employed in a control device for an internal combustion engine according to a second embodiment of the present invention.
Figure 5:
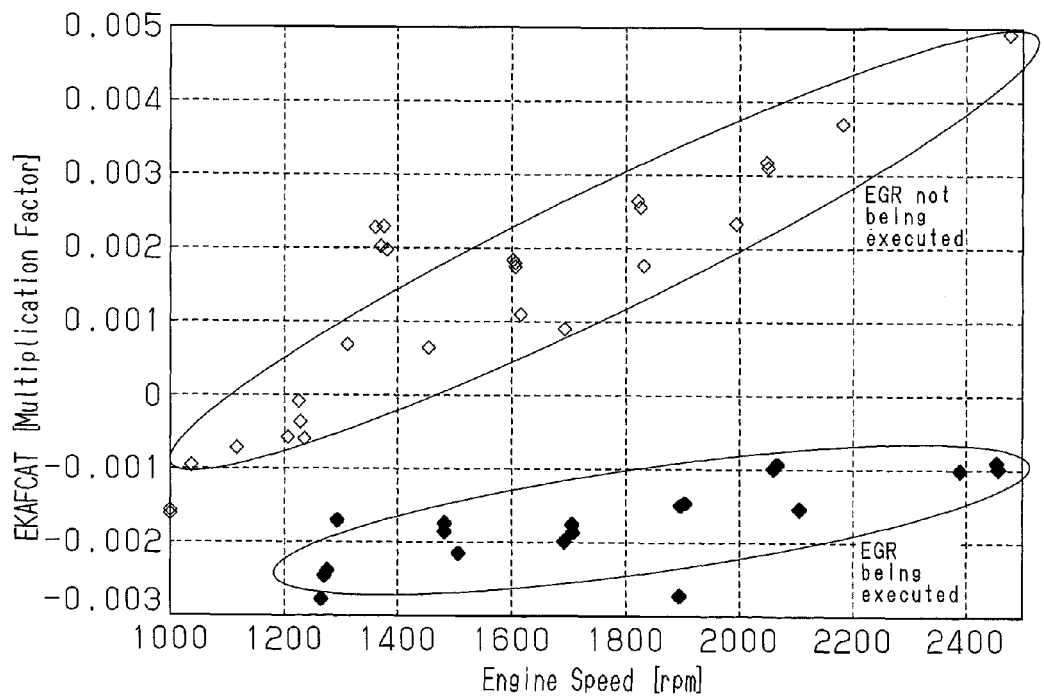
FIG. 5 is a graph showing a relationship between an engine speed and a parameter EKAFCAT in two cases: a case in which EGR is being executed and a case in which EGR is not being executed.

FIG. 4 shows a flowchart of a target air-fuel ratio setting routine used in the present embodiment. The process of the routine is repeatedly executed as an interrupt by the electronic control unit 20, for example, at predetermined time intervals during operation of the engine.

When the routine is started, the electronic control unit 20 calculates at step S200 a target air-fuel ratio F(NE, KL) for non-execution of EGR at the current engine speed NE and the current engine load KL.

At the subsequent step S201, the electronic control unit 20 calculates a target air-fuel ratio G(NE, KL) for full execution of EGR at the current engine speed NE and the current engine load KL. The full execution of EGR refers to a state in which EGR is being executed at the current engine speed and the current engine load with the EGR valve 19 fully opened. Also, as described above, the window is shifted to the leaner side when EGR is being executed than when EGR is not being executed. Thus, the target air-fuel ratio G(NE, KL) for the full execution of EGR is set to be leaner than the target air-fuel ratio F(NE, KL) for the non-execution of EGR.

Subsequently, the electronic control unit 20 calculates a ratio γ of the EGR amount at the full execution of EGR and the current EGR amount in the subsequent step S202. In the subsequent step S203, the electronic control unit 20 calculates a target air-fuel ratio EABYFREF based on the following expression (2).

$$EABYFREF = \gamma \times G(NE, KL) + (1-\gamma) \times F(NE, KL) \quad (2)$$

The present embodiment as described above has the following advantages.

(4) The present embodiment is applied to an internal combustion engine that executes air-fuel ratio control based on a detection result of the oxygen concentration of exhaust gas. Specifically, the electronic control unit 20 executes engine control such that, when the EGR amount is large, the detection value of the air-fuel ratio at the section upstream of the catalyst in the exhaust pipe becomes a value that indicates a leaner air-fuel ratio compared to that in the non-execution state. As described above, the window, or the range of air-fuel ratio allowing proper exhaust purification, was observed to be shifted to the leaner side as the EGR amount was increased. In this respect, when the EGR amount is large in the present embodiment, the engine control is executed such that, compared to a case in which the EGR amount is small, the detection value of the air-fuel ratio at the section upstream of the front catalyst 14 provided in the exhaust pipe 3 becomes a value that indicates a leaner air fuel ratio. Therefore, the controlled air-fuel ratio follows shifting of the window in response to execution of EGR, so that the air-fuel ratio control is executed more adequately in accordance with the execution state of EGR.

(5) In the present embodiment, the target air-fuel ratio is adjusted in accordance with the execution state of EGR. More specifically, the larger the EGR amount, the leaner the value of the target air-fuel ratio is changed. This allows the controlled air-fuel ratio to accurately follow a change of the window in response to execution of EGR.

(6) The present embodiment is applied to an internal combustion engine that executes air-fuel ratio control based on a detection result of the oxygen concentration of exhaust gas. Specifically, the electronic control unit 20 executes feedback control of the target air-fuel ratio in the air-fuel ratio control in accordance with the execution state of EGR. Specifically, such feedback is executed by setting the target air-fuel ratio such that the larger an increase in the EGR amount, the leaner the value of the target air-fuel ratio is changed. Depending on the execution state of EGR, the window, or the range of the air-fuel ratio allowing proper exhaust purification, changes. Therefore, if the target air-fuel ratio in the air-fuel ratio control is subjected to feedback control in accordance with the execution state of EGR, it is possible to allow the target air-fuel ratio to follow changes of the window due to the execution state of EGR. Accordingly, the present embodiment allows the air-fuel ratio control to be properly executed in accordance with the execution state of EGR.

The above described embodiments may be modified as follows.

In the above described embodiments, engine control is executed in the following manner. That is, when the EGR amount is large, the detection value of the air-fuel ratio at the section upstream of the front catalyst 14 is set to a value indicating a leaner air-fuel ratio compared to when the EGR amount is mall through adjustment of the target air-fuel ratio in accordance with the execution state of EGR. Such engine control may be implemented in any of the following manners A to D.

A. Manipulation of Fuel Injection Valve

Separately from the air-fuel ratio feedback correction, the detection value of the air-fuel ratio at the section upstream of the front catalyst 14 may be adjusted by correcting the fuel injection amount in accordance with the execution state of EGR. The above described engine control can be executed by adjusting the fuel injection amount in accordance with the execution state of EGR. Specifically, the above described engine control can be executed by reducing the fuel injection amount when EGR is being executed compared to when EGR is not being executed, or by reducing the fuel injection amount in accordance with increase in the EGR amount.

B. Manipulation of Rich/Lean Determination Value Output from Oxygen Sensor

The detection value of the air-fuel ratio at the section upstream of the front catalyst 14 may also be adjusted by manipulating a rich/lean determination value output from the oxygen sensor 15 arranged in the exhaust pipe 3. For example, if the determination value is shifted to the leaner side, the air-fuel ratio detection value at the section upstream of the front catalyst 14 is also shifted to the leaner side. Therefore, the above described engine control can be executed by changing the rich/lean determination value output from the oxygen sensor 15 in accordance with the execution state of EGR. Specifically, the above described engine control can be executed by setting the determination value to a leaner value during execution of EGR than in the non-execution of EGR or by setting the determination value to a leaner value in accordance with increase in the EGR amount.

C. Manipulation of Feedback Gain of Fuel Injection Amount

The detection value of the air-fuel ratio at the section upstream of the front catalyst 14 may also be adjusted by manipulating a feedback gain of the fuel injection amount in the air-fuel ratio control. For example, if the feedback gain, which is used when the air-fuel ratio is changed to the leaner side, is increased, the air-fuel ratio detection value at the section upstream of the front catalyst 14 is shifted to the leaner side. Therefore, the above described engine control can be executed by changing the feedback gain of the fuel injection amount in the air-fuel ratio control in accordance with the execution state of EGR. Specifically, the above described engine control can be executed by increasing the feedback gain, which is used when the air-fuel ratio is changed to the leaner side, when EGR is being executed compared to when EGR is not executed, or by increasing the feedback gain in accordance with increase in the EGR amount.

D. Manipulation of Output of Air-Fuel Ratio Sensor 13

The detection value of the air-fuel ratio at the section upstream of the front catalyst 14 may also be adjusted by adjusting output of the air-fuel ratio sensor 13. For example, if the main feedback of the air-fuel ratio is executed based on a value obtained by correcting the output of the air-fuel ratio sensor 13 to the leaner side, the air-fuel ratio detection value at the section upstream of the front catalyst 14 is shifted to the leaner side. Therefore, the above described engine control can be executed by adjusting the output of the air-fuel ratio sensor 13 in accordance with the execution state of EGR. Specifically, the above described engine control can be executed by correcting the output of the air-fuel ratio sensor 13 to the leaner side during execution of EGR or by increasing the amount of correction of the output of the air-fuel ratio sensor 13 to the leaner side in accordance with increase in the EGR amount.

The present invention may be applied to any internal combustion engine that has a configuration different from that illustrated in FIG. 1 as long as the engine executes EGR and air-fuel ratio control in accordance with a detection result of the oxygen concentration of exhaust gas. The control device of the present invention may also be applied to any internal combustion engine that is not mounted in a vehicle.

DESCRIPTION OF THE REFERENCE NUMERALS

1 . . . Intake Pipe, 2 . . . Combustion Chamber, 3 . . . Exhaust Pipe, 4 . . . Air Cleaner, 5 . . . Air Flowmeter, 6 . . . Throttle Valve, 7 . . . Injector, 8 . . . Intake Port, 9 . . . Intake Valve, 10 . . . Ignition Plug, 11 . . . Exhaust Port, 12 . . . Exhaust Valve, 13 . . . Air-Fuel Ratio Sensor, 14 . . . Front Catalyst, 15 . . . Oxygen Sensor, 16 . . . Rear Catalyst, 17 . . . EGR Passage, 18 . . . EGR Cooler, 19 . . . EGR Valve, 20 . . . Electronic Control Unit, 21 . . . NE sensor, 22 . . . Accelerator Pedal Sensor, 23 . . . Throttle Sensor

The invention claimed is:

1. An internal combustion engine, which executes exhaust gas recirculation, comprising:
   a cylinder;
   an exhaust pipe;
   a catalyst located in the exhaust pipe;
   a fuel injection valve; and
   a processor circuit executing air-fuel ratio control based on a detection result of an oxygen concentration of exhaust gas, such that an air-fuel ratio of air-fuel mixture to be burned in the cylinder becomes a value in a window, which is a range of air-fuel ratios allowing proper purification of exhaust gas by the catalyst,
   the processor circuit being configured to execute engine control by controlling a fuel amount injected from the fuel injection valve such that, at the air-fuel ratio control when an amount of exhaust gas recirculation is large, a detection result of the air-fuel ratio based on the oxygen concentration of exhaust gas at a section upstream of the catalyst has a value indicating a leaner air-fuel ratio compared to a case in which the exhaust gas recirculation amount is small, thereby causing the air-fuel ratio of the air-fuel mixture to follow a change of the window, which is shifted to a leaner side in response to execution of the exhaust gas recirculation,
   wherein the window represents the relationship between the stoichiometric air-fuel ratio and the controlled air-fuel ratio optimal for exhaust purification,
   the processor circuit being configured to control the fuel amount injected from the fuel injection valve such that the followed air-fuel ratio of the air-fuel mixture falls within the shifted window in order to properly execute the air-fuel ratio control by changing an actual air-fuel ratio,
   the processor circuit being configured to execute the air-fuel ratio control in an operating range in which the air-fuel ratio of executing the exhaust gas recirculation is leaner than that of non-executing of the exhaust gas recirculation such that the air-fuel ratio becomes the value in the window,
   the window is calculated based on an execution state of the exhaust gas recirculation.

2. The internal combustion engine according to claim 1, wherein, when the exhaust gas recirculation is being executed, the processor circuit sets a target air-fuel ratio to a leaner value compared to when the exhaust gas recirculation is not being executed.

3. The internal combustion engine according to claim 1, wherein the processor circuit changes a target air-fuel ratio such that the larger the amount of the exhaust gas recirculation, the leaner the target air-fuel ratio becomes.

4. An internal combustion engine, which executes exhaust gas recirculation, comprising:
   a cylinder;
   an exhaust pipe;
   a catalyst located in the exhaust pipe;
   a fuel injection valve; and
   a processor circuit executing air-fuel ratio control based on a detection result of an oxygen concentration of exhaust gas, such that an air-fuel ratio of air-fuel mixture to be burned in the cylinder becomes a value in a window, which is a range of air-fuel ratios allowing proper purification of exhaust gas by the catalyst,
   the processor circuit being configured to execute feedback control of a target air-fuel ratio in the air-fuel ratio control by controlling a fuel amount injected from the fuel injection valve in accordance with an execution state of exhaust gas recirculation, such that the air-fuel ratio of the air-fuel mixture follows shifting of the window to a leaner side in response to execution of the exhaust gas recirculation,
   wherein the window represents the relationship between the stoichiometric air-fuel ratio and the controlled air-fuel ratio optimal for exhaust purification,
   the processor circuit being configured to control the fuel amount injected from the fuel injection valve such that the followed air-fuel ratio of the air-fuel mixture falls within the shifted window in order to properly execute the air-fuel ratio control by changing an actual air-fuel ratio, the processor circuit being configured to execute the air-fuel ratio control in an operating range in which the air-fuel ratio of executing the exhaust gas recirculation is leaner than that of non-executing of the exhaust gas recirculation such that the air-fuel ratio becomes the value in the window, the window is calculated based on the execution state of the exhaust gas recirculation.

5. The internal combustion engine according to claim 4, wherein, when the exhaust gas recirculation is being executed, the processor circuit sets the target air-fuel ratio to a leaner value compared to when the exhaust gas recirculation is not being executed.

6. The internal combustion engine according to claim 4, wherein the processor circuit changes the target air-fuel ratio such that the larger an amount of the exhaust gas recirculation, the leaner the target air-fuel ratio becomes.

* * * * *